United States Patent
Higuchi et al.

[11] Patent Number: 6,132,652
[45] Date of Patent: *Oct. 17, 2000

[54] METHOD OF PRODUCING LIGHTGUIDE PLATE FOR SURFACE LIGHT SOURCE, LIGHTGUIDE PLATE FOR SURFACE LIGHT SOURCE AND SURFACE LIGHT SOURCE USING THE SAME

[75] Inventors: Masahiro Higuchi, Anpachi-Gun; Takanari Kusafuka, Yohro-Gun; Yoshiaki Maeno, Motosu-Gun, all of Japan

[73] Assignee: Sanyo Electric Co., Ltd., Osaka-fu, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/742,500

[22] Filed: Nov. 1, 1996

[30] Foreign Application Priority Data

| Nov. 2, 1995 | [JP] | Japan | 7-286046 |
| Nov. 2, 1995 | [JP] | Japan | 7-286047 |
| Nov. 22, 1995 | [JP] | Japan | 7-304434 |
| Sep. 30, 1996 | [JP] | Japan | 8-259631 |

[51] Int. Cl.$^7$ ........................... B29D 11/00
[52] U.S. Cl. .................. 264/1.7; 264/1.1; 264/1.9; 264/2.5; 425/808
[58] Field of Search ............... 264/1.7, 1.9, 1.1, 264/132, 2.5; 425/808, 190, 193

[56] References Cited

U.S. PATENT DOCUMENTS

| 4,360,329 | 11/1982 | Hatakeyama | 264/132 |
| 4,743,410 | 5/1988 | Grethen et al. | 264/1.7 |
| 4,888,201 | 12/1989 | Veenvliet et al. | 264/1.9 |
| 5,013,494 | 5/1991 | Kubo et al. | 264/2.5 |
| 5,626,800 | 5/1997 | Williams et al. | 264/1.9 |
| 5,728,324 | 3/1998 | Welch et al. | 264/2.5 |

FOREIGN PATENT DOCUMENTS

| 1-110939 | 4/1989 | Japan | 264/2.5 |
| 4-107201 | 9/1992 | Japan . | |
| 7-117144 | 10/1993 | Japan . | |

*Primary Examiner*—Mathieu D. Vargot
*Attorney, Agent, or Firm*—Darby & Darby

[57] ABSTRACT

In a method of producing a lightguide plate for surface light source according to the present invention, a plate-shaped metal mold for defining the shape of a part of a cavity of a molding die and particularly, the shape of a light emitting surface of the lightguide plate for surface light source (a concavo-convex shape, a lenticular lens shape, etc.) is provided so as to be replaceable, to form a cavity having a desired shape by the replacement of the plate-shaped metal mold. Resin liquid is injected into the cavity, its resin liquid is solidified, and the resin is then released from the cavity. Consequently, a lightguide plate for surface light source having a desired shape and particularly, having its light emitting surface in a desired shape is produced.

15 Claims, 7 Drawing Sheets

METHOD OF PRODUCING LIGHTGUIDE PLATE FOR SURFACE LIGHT SOURCE, LIGHTGUIDE PLATE FOR SURFACE LIGHT SOURCE AND SURFACE LIGHT SOURCE USING THE SAME

BACKGROUND OF THE INVENTION

Field of the Invention

The present invention relates to a method of producing a lightguide plate which is a component of a surface light source used for a back light of a liquid crystal device or the like, a lighting advertisement, a traffic-control sign, etc., and a lightguide plate for surface light source and a surface light source using the same.

Figure 10:
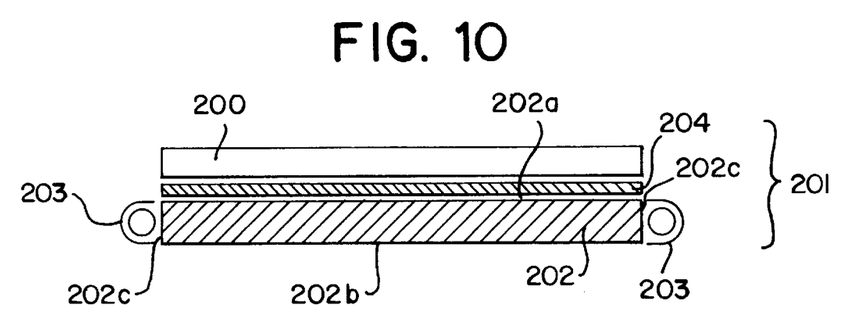
FIG. 10 is a schematic cross-sectional view showing a liquid crystal display device using a conventional lightguide plate for surface light source.

As shown in FIG. 10, a surface light source 201 serving as a back light is arranged on the side of the rear surface of a liquid crystal panel (LCD) 200. The surface light source 201 comprises a lightguide plate 202 composed of a transparent flat plate, fluorescent tubes 203 arranged on both its side surfaces, and a lens film 204 arranged on a light emitting surface 202a of the lightguide plate 202.

A surface on the upper side in the drawing of the lightguide plate 202 is the above-mentioned light emitting surface 202a, a surface on the lower side to be the reverse side of the light emitting surface 202a is a light transmission preventing surface 202b, and a side surface of the lightguide plate 202 is a light incident surface 202c. When light from the fluorescent tubes 203 is incident on the light incident surface 202c, the light is totally reflected in the lightguide plate 202, and is all propagated to the whole area of the lightguide plate 202. A part of the propagated light becomes diffused reflected light at less than a critical angle by light scattering reaction of the light transmission preventing surface 202b, and is emitted from the light emitting surface 202a of the lightguide plate 202. The emitted light leads to the lens film 204.

The lens film 204 has a projection of a triangular prismtype lenticular lens on its one surface, and the other surface thereof is a smooth surface. The lens film 204 is affixed to the surface 202a of the lightguide plate 202 with the projection directed upward. The light emitted from the surface 202a of the lightguide plate 202 is isotropically and uniformly diffused in a predetermined angular range by passing through the lens film 204 (see Japanese Utility Model Laying-open Gazette No. 107201/1992).

Furthermore, Japanese Utility Model Laying-Open Gazette No. 162201/1980 discloses a lightguide plate for surface light source in which a light scattering layer constructed by mixing particles having a light scattering effect and adhesives is formed between a transparent plastic plate and a reflecting plate.

Furthermore, U.S. Pat. No. 4,729,067 discloses a technique using a mat transparent diffusing plate (a mat transparent sheet) in place of the above-mentioned lens film 204. However, a technique using the lens film 204 or a technique simultaneously using the lens film 204 and the mat transparent diffusing plate is more advantageous in that light energy of a light source is intensively distributed in a desired restricted angular range, and diffused light high in uniformity and isotropy is obtained in the angular range, as compared with the technique using the mat transparent diffusing plate.

Figure 11:
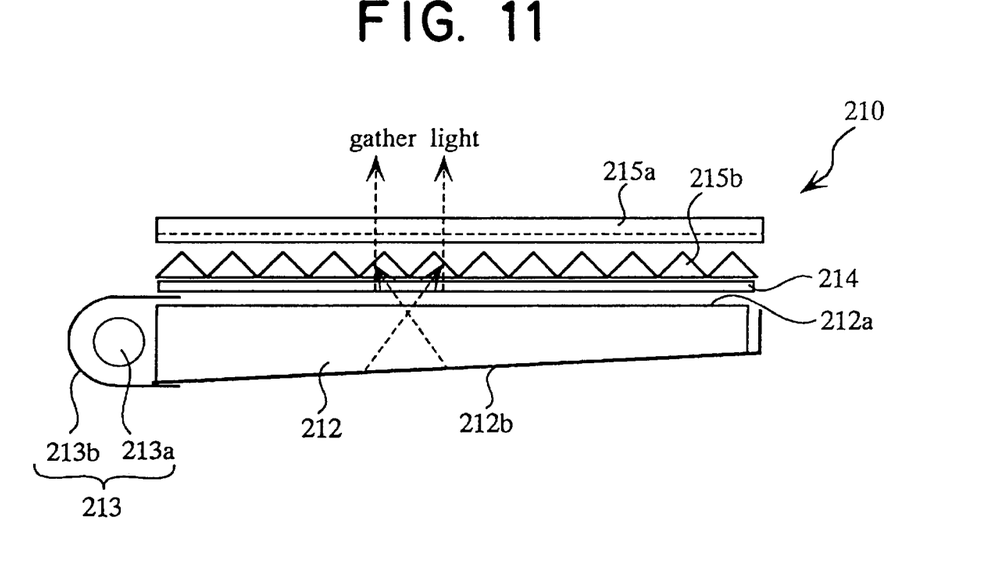
FIG. 11 is a schematic cross-sectional view showing a liquid crystal display device using a conventional lightguide plate for surface light source.

Furthermore, a surface light source 210 shown in FIG. 11 is known. The surface light source 210 comprises a plate-shaped lightguide plate 212, a fluorescent tube 213 arranged on its one side surface, a diffusing plate 214 arranged on a surface 212a on the light emission side of the lightguide plate 212, and first and second lenticular lens sheets 215a and 215b arranged on a surface on the light emission side of the diffusing plate 214. The fluorescent tube 213 comprises a cold-cathode tube 213a and a reflector 213b. Each of the first and second lenticular lens sheets 215a and 215b is constructed by forming a lot of lens portions in a prism shape on its one surface. The lenticular lens sheets 215a and 215b are overlapped with each other upon being so arranged that the directions in which the lens portions in a prism shape are formed are perpendicular to each other. The surface light source 210 having such a structure has the advantage that high luminance is achieved. On the other hand, the surface light source 210 comprises the two lenticular lens sheets 215a and 215b, whereby the cost thereof is increased.

A surface light source given a lens function by forming a concavo-convex pattern in a material itself composing a lightguide plate has been also known.

Description is now made of a method of producing a lightguide plate for surface light source constructed by forming a concavo-convex pattern in a material itself composing the lightguide plate. In producing a lightguide plate for surface light source, a molding die comprising a pair of metal molds which can be divided is used. It is possible to obtain a lightguide plate for surface light source by processing a portion constituting a cavity in the pair of metal molds into a shape corresponding to the size and the outer shape (the plane shape, the concavo-convex shape of the surface, etc.) of a required lightguide plate, coupling the metal molds to each other to form the cavity, injecting resin liquid into the cavity, solidifying its resin liquid and then releasing the resin from the cavity.

In the conventional method of producing a lightguide plate, however, a concavo-convex shape corresponding to a recessed and projected surface of the lightguide plate is formed in the metal mold itself, whereby the cost of the molding die is increased, and the cost of the molding die is reflected in the cost of the lightguide plate, whereby the cost of the lightguide plate is increased. When a plurality of types of lightguide plates which differ in the size and the outer shape are formed, a molding die is required for each type, whereby the cost thereof is further increased.

Figures 12A, 12B, 12C:
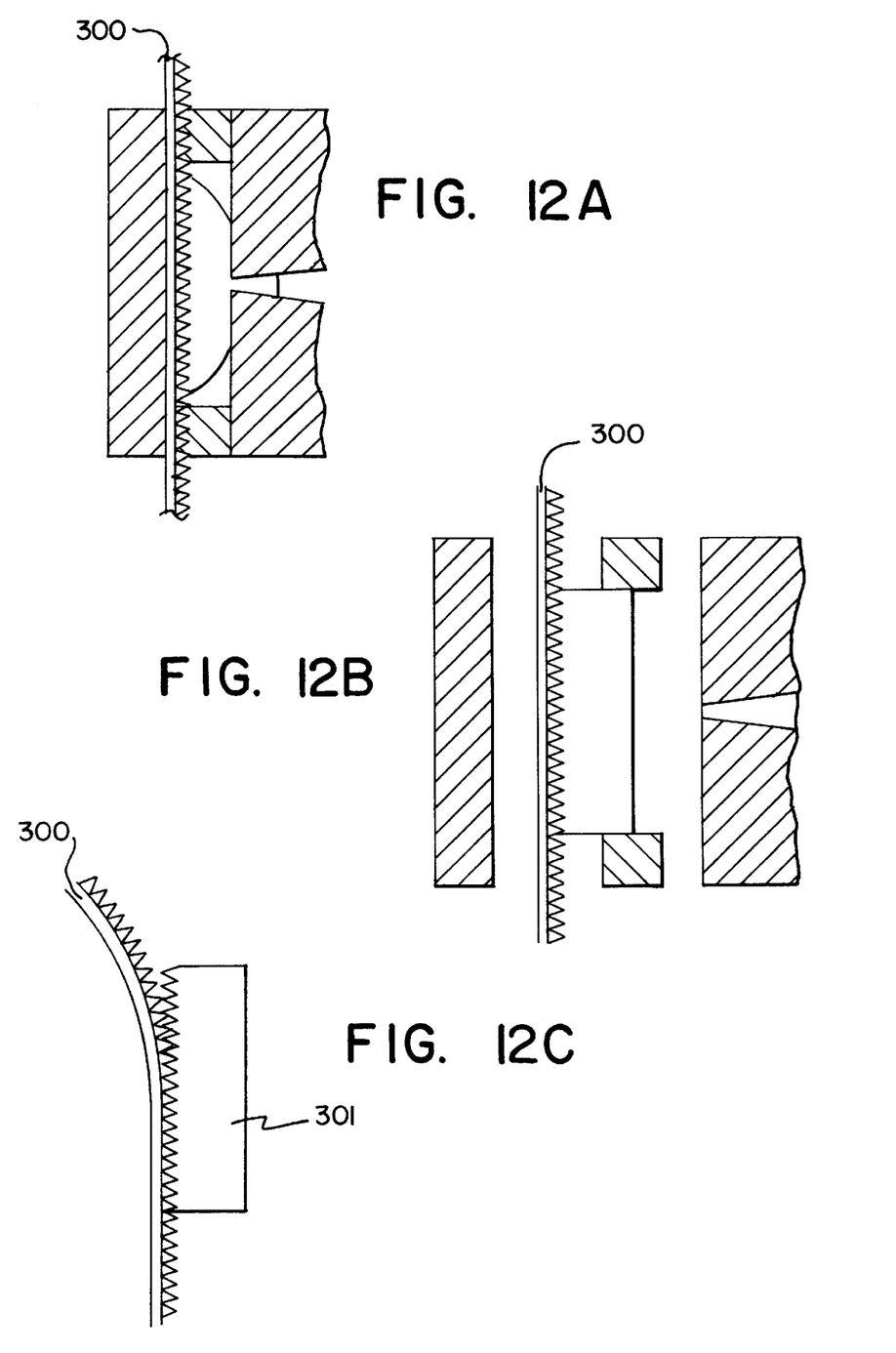
FIGS. 12A, 12B and 12C are diagrams of steps showing a method of forming a light emitting surface using a conventional resin sheet.

Japanese Patent Laying-Open Gazette No. 117144/1995 discloses a technique in which the necessity of forming a concavo-convex shape in a metal mold itself is eliminated. This technique is a method of obtaining a lightguide plate 301 having a recessed and projected surface using a material itself composing the lightguide plate by injecting resin into a cavity in a state where a resin sheet 300 having a concavo-convex shape is arranged in the cavity, solidifying the resin, and then stripping the resin sheet 300, as shown in FIGS. 12A, 12B and 12C.

In a method using the resin sheet 300, however, it is difficult to repeatedly use the resin sheet 300 many times. As more lightguide plates 301 are produced, therefore, more resin sheets 300 are consumed. Consequently, the cost thereof is increased by the consumption, and the number of industrial wastes is increased by discarding the resin sheets 300.

The present invention has been made in view of the foregoing circumstances, and has for its object to provide a method of producing a lightguide plate for surface light source having a concavo-convex shape without forming a concavo-convex shape in a metal mold itself and without using a resin sheet. The present invention also has for its object to provide a method of producing a lightguide plate for surface light source in which it is possible to form a light transmission preventing surface (a reflecting surface) composed of a thin film simultaneously with the resin injecting step. The present invention also has for its object to provide a lightguide plate for surface light source capable of achieving higher luminance without providing two lenticular lens sheets, and a surface light source comprising the lightguide plate for surface light source, as contrasted with the prior art shown in FIG. 11.

SUMMARY OF THE INVENTION

A method of producing a lightguide plate for surface light source according to the present invention is characterized by providing a defining member for defining the shape of a part of a cavity of a molding die so as to be replaceable, forming a cavity having a desired shape by the replacement of the defining member, injecting resin liquid into the cavity, solidifying its resin liquid and then releasing the resin from the cavity, and producing the lightguide plate for surface light source in a desired shape.

Consequently, in producing a plurality of types of lightguide plates for surface light source, a molding die itself need not be replaced, and the defining member may be only replaced depending on the type. Consequently, a molding die need not be prepared so as to correspond to each of the types, whereby the production cost can be reduced. The processing cost and the repairing cost of a fine pattern can be made lower than those in forming a fine pattern in a molding die itself. Further, there is no problem that in a case where conventional resin sheets are used, industrial wastes are increased by discarding the conventional resin sheets.

A method of producing a lightguide plate for surface light source according to the present invention is characterized by so arranging a thermal transfer foil constructed by applying a light transmission preventing material to a base film in the state of a thin film layer that the light transmission preventing material is directed toward a cavity between one of metal molds of a molding die and the other metal mold and on a surface to be a light transmission preventing surface of the lightguide plate for surface light source, coupling the one metal mold and the other metal mold to each other to form a cavity, injecting resin into the cavity, and transferring a light transmission preventing material to the surface to be the light transmission preventing surface of the lightguide plate for surface light source by melting heat and molding pressure at the time of the injection of the resin.

Even in the lightguide plate for surface light source having a structure in which a light transmission preventing surface is not composed of the concavo-convex pattern of a material itself composing the lightguide plate for surface light source, therefore, the light transmission preventing surface can be formed simultaneously with the formation of the lightguide plate for surface light source using the molding die, so that the number of steps is reduced. Therefore, the cost of the lightguide plate for surface light source can be reduced.

In a lightguide plate for surface light source for emitting, from a light emitting surface thereof, light emitted from a light fixture provided adjacent to at least one of its side surfaces, a lightguide plate for surface light source according to the present invention is characterized in that a first lenticular lens composed of the concavo-convex pattern of resin itself composing the lightguide plate for surface light source is formed on the light emitting surface, and a second lenticular lens composed of the concavo-convex pattern of resin itself composing the lightguide plate for surface light source is formed on a light reflecting surface on the opposite side of the light emitting surface.

Consequently, the number of components can be reduced, as compared with that in a surface light source having a conventional structure using a lens sheet apart from a lightguide plate for surface light source, whereby the construction is simplified, and the production cost is reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS (Embodiment 1)

Figure 1:
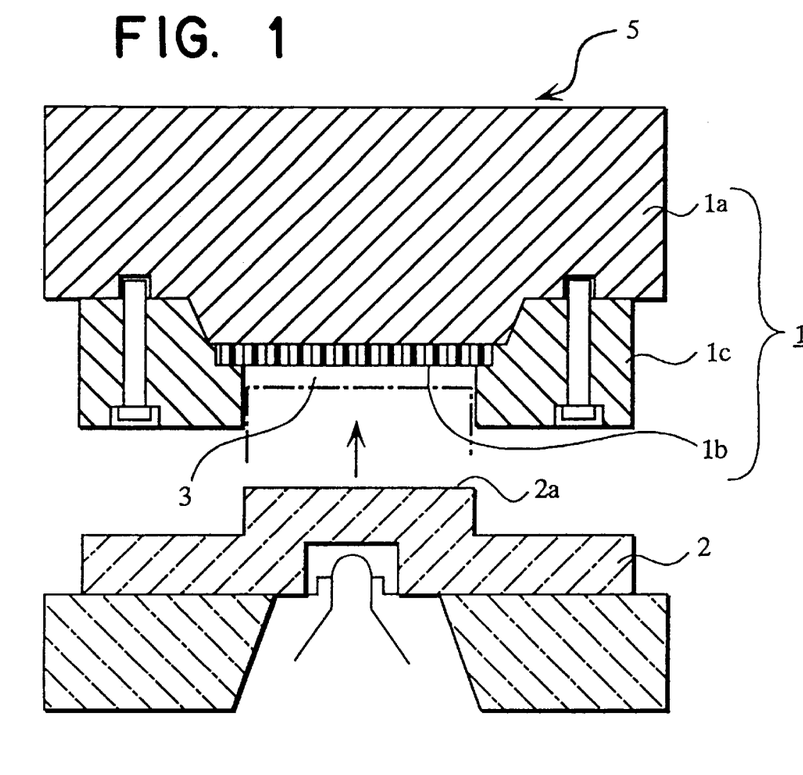
FIG. 1 is a cross-sectional view showing a state before coupling a molding die used in a method of producing a lightguide plate for surface light source according to an embodiment 1 of the present invention.
Figure 2:
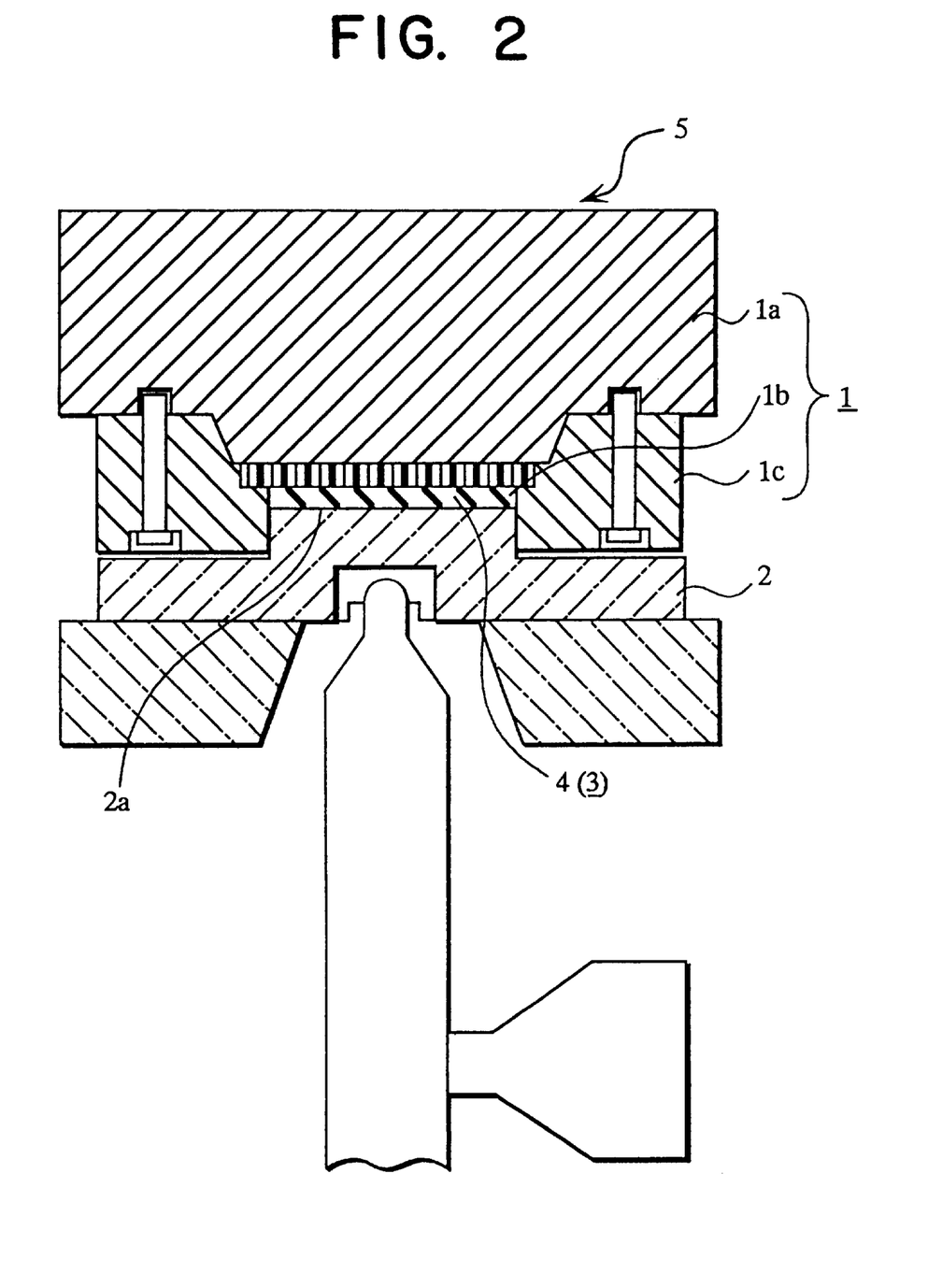
FIG. 2 is a cross-sectional view showing a state where resin is injected into a cavity after coupling a molding die used in a method of producing a lightguide plate for surface light source according to the embodiment 1 of the present invention.
Figures 3, 3A, 4:
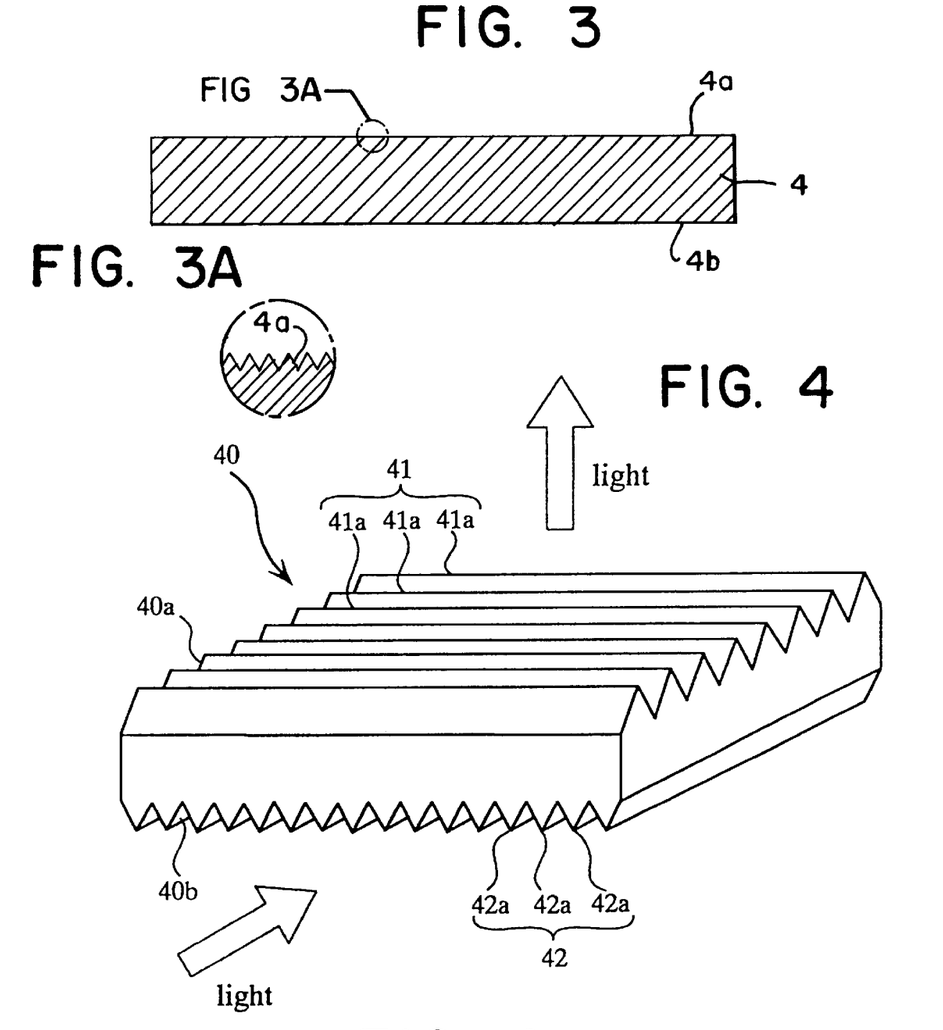
FIG. 3 is a cross-sectional view showing a lightguide plate for surface light source produced using the molding die shown in FIGS. 1 and 2.
FIG. 4 is a perspective view showing a lightguide plate for surface light source according to the present invention which can be produced using the molding die shown in FIGS. 1 and 2.

FIG. 1 is a cross-sectional view showing a state before coupling a molding die 5 used in a producing method according to the present embodiment, FIG. 2 is a cross-sectional view showing a state where resin is injected into a cavity 3 after coupling the molding die 5 shown in FIG. 1, and FIG. 3 is a cross-sectional view showing a lightguide plate for surface light source 4 produced using the molding die 5 shown in FIGS. 1 and 2.

As shown in FIG. 3, in the lightguide plate for surface light source 4 (approximately 1 to 10 mm in thickness), its light emitting surface 4a has such a fine pattern that it is projected in a prism shape or a quadrangular pyramid shape in order to emit light incident from its side surface toward a liquid crystal display device (not shown) uniformly throughout the surface and directionally. Each of prism-shaped portions in the fine pattern has a vertical angle (a prism angle) of 90°, a pitch of 31 µm, and a height of 31 µm, for example, and the prism-shaped portions are uniformly formed on the whole surface. Therefore, the lightguide plate for surface light source 4 has a lens function for causing emitted light to have directionality (a direction perpendicular to the light emitting surface 4a). On the other hand, a light transmission preventing surface 4b opposite to the light emitting surface 4a is formed in a coarse surface shape, to prevent the transmission of the light. The above-mentioned fine pattern may be a lenticular lens pattern.

The lightguide plate for surface light source 4 having such a structure has the advantages that it is possible to reduce the cost thereof in that no lens sheet is required, and it is possible to avoid the reduction in light transmission efficiency based on the intervention of an air layer occurring when a lens sheet is affixed and the difference in the index of refraction between a resin plate and a lens sheet, as compared with that having the conventional structure in which a lens sheet is affixed to a transparent resin plate. Consequently, the luminance of a surface light source can be increased, as compared with that in the conventional example. In other words, the power consumption of the light source can be reduced to reduce the running cost if the luminance may be approximately the same as that in the conventional example. When the surface light source is driven by batteries, the reduction of the running cost is particularly effective.

As shown in FIGS. 1 and 2, the molding die 5 comprises a first metal mold (on the fixed side) 1 and a second metal mold (on the movable side) 2 which can be divided.

The first metal mold 1 comprises a common use base portion 1a, a plate-shaped metal mold 1b, and a holding member 1c. The plate-shaped metal mold 1b has a pattern surface corresponding to the fine pattern of the light emitting surface 4a of the lightguide plate for surface light source 4, and is arranged with its surface opposite to the pattern surface (hereinafter referred to as a ground surface) directed toward the common use base portion 1a. The plate-shaped metal mold 1b thus arranged defines the shape of a part of the cavity 3 of the molding die 5 (a portion corresponding to the light emitting surface 4a of the lightguide plate for surface light source 4). The plate-shaped metal mold 1b is so provided as to be replaceable with respect to the common use base portion 1a.

The holding member 1c is for holding an outer edge portion of the plate-shaped metal mold 1b and fixing the outer edge portion to the common use base portion 1a. The holding member 1c is for also defining the shape of a part of the cavity 3 of the molding die 5 (a side surface portion of the lightguide plate for surface light source 4), and is detachable from the common use base portion 1a by a bolt. That is, the holding member 1c is also replaceable.

The second metal mold 2 has a projection 2a for defining a part of the cavity 3 (a portion corresponding to the light transmission preventing surface 4b of the lightguide plate for surface light source 4). An upper surface portion of the projection 2a has such a rough surface pattern that its surface is roughened by sand blasting or the like.

Description is now made of a method of producing the lightguide plate for surface light source 4 using the above-mentioned molding die 5. From a state where the first metal mold 1 and the second metal mold 2 are separated from each other as shown in FIG. 1, the second metal mold 2 is moved toward the first metal mold 1 to couple the molds to each other as shown in FIG. 2. Thereafter, thermoplastic resin in a molten state which is held at a temperature of approximately 200° C. is injected into the cavity 3 formed by the coupling from an inlet (not shown) at a pressure of 200 kg/cm².

As the thermoplastic resin, acrylic resin or polycarbonate resin is mainly used. It is possible to use the other resin superior in optical properties, for example, acrylic ester (polymethyl methacrylate, polyacrylic acid methyl, etc.), methacrylate ester alone or its copolymers, polyester (polyethylene terephthalate, polybutylene terephthalate, etc.), polystyrene, polymethylpentene, acrylate (multifunctional urethane acrylate, polyester acrylate, etc. cross-linked by ultraviolet rays or electron beams), or unsaturated polyester.

If the step of filling the cavity 3 with the thermoplastic resin is terminated, the step of cooling the thermoplastic resin for a predetermined time on the basis of a temperature program determined by the curing conditions of the thermoplastic resin is carried out. When the thermoplastic resin is solidified in the cooling step, a lightguide plate for surface light source 4 having an outer shape corresponding to the fine pattern of the plate-shaped metal mold 1b and the rough surface pattern of the projection 2a is obtained. If the cooling step is terminated, the first metal mold 1 and the second metal mold 2 are separated from each other, to take out the lightguide plate for surface light source 4.

When the other lightguide plate for surface light source 4 which differs in the pattern of the light emitting surface 4a but is the same in the entire dimensions is produced, the plate-shaped metal mold 1b is detached, and the other plate-shaped metal mold having a desired pattern is attached to the common use base portion 1a. The above-mentioned steps are carried out again, whereby it is possible to obtain a different type of lightguide plates for surface light source 4.

When the other lightguide plate for surface light source 4 which is the same in the pattern of the light emitting surface 4a but differs in the entire dimensions is produced, the plate-shaped metal mold 1b is used as it is, and the holding member 1c and the second metal mold 2 are replaced. The above-mentioned steps are carried out again, whereby it is possible to obtain a lightguide plate for surface light source 4 which differs in the dimensions.

When the other lightguide plate for surface light source 4 which differs in the pattern of the light emitting surface 4a and also differs in the entire dimensions is produced, the plate-shaped metal mold 1b, the holding member 1c and the second metal mold 2 are replaced. The above-mentioned steps are carried out again, whereby it is possible to obtain a different type of lightguides plates for surface light source 4.

In such a method of producing a lightguide plate for surface light source, when a plurality of types of lightguide plates for surface light source are produced, the molding die 5 itself need not be replaced, and the plate-shaped metal mold 1b, or the holding member 1c and the second metal mold 2 may be only replaced depending on each of the types. Consequently, the molding die 5 need not be prepared in correspondence to each of the types, whereby the production cost can be reduced. Further, the processing cost and the repairing cost of the fine pattern are made lower than those in forming a fine pattern in the first metal mold 1 itself. In addition, there is no problem that in a case where resin sheets are used, industrial wastes are increased by discarding the resin sheets. Further, the light transmission preventing surface 4b of the lightguide plate for surface light source 4 is shaped by the rough surface pattern of the projection 2a, whereby the number of steps can be reduced, as compared with that in a method of forming the light transmission preventing surface 4b after the molding step using the molding die 5.

If the second metal mold 2 is brought into such a flat shape that it has no projection 2a, and is made to have a rough surface pattern corresponding to the lightguide plate for surface light source 4 of the maximum size which can be produced, the necessity of replacing the second metal mold 2 can be eliminated in the production of the lightguide plate for surface light source 4 which differs in the dimensions. Therefore, the sharing of the molding die 5 is further promoted, whereby the production cost can be further reduced.

Although in the present embodiment, only the first metal mold 1 has a structure in which the plate-shaped metal mold 1b or the holding member 1c is so provided as to be replaceable, the second metal mold 2 may have the same structure as that of the first metal mold 1. Further, although in the present embedment, one lightguide plate for surface light source 4 is produced from one molding die, the present invention is not limited. For example, a partition plate for partitioning the cavity 3 into two is mounted on the holding member 1c, whereby it is possible to simultaneously produce a plurality of lightguide plates of the same size or different sizes in one step. In this case, if a combination of lightguide plates to be produced is determined in consideration of the size of the molding die, the utilization efficiency of the molding die is improved, whereby the production cost can be further reduced.

A method of producing the plate-shaped metal mold 1b will be then briefly described. An original plate for producing the plate-shaped metal mold 1b is prepared. The pattern surface of the original plate is formed by photolithography, and physical vapor deposition (PVD) such as sputtering or vacuum vapor deposition. A metal abundant in durability such as nickel is deposited to a thickness of approximately 0.2 to 0.3 mm by electroforming on the pattern surface of the original plate. Further, the rear surface of a thin plate of the deposited metal (a surface opposite to the fine pattern surface) is subjected to grinding, to planish the rear surface. The fine plate of the deposited metal is stripped from the original plate. Consequently, the plate-shaped metal mold 1b having a fine pattern surface and a ground surface is obtained. The plate-shaped metal mold 1b is arranged with the ground surface directed toward the common use base portion 1a, whereby the positional precision of the fine pattern is enhanced. The production of the plate-shaped metal mold 1b is not limited to the above-mentioned method. For example, the plate-shaped metal mold 1b may be produced by preparing a metal flat plate to directly form a fine pattern on the surface thereof using a laser beam process or photolithography.

FIG. 4 is a perspective view showing a lightguide plate for surface light source 40 of a type different from that of the above-mentioned lightguide plate for surface light source 4. The lightguide plate for surface light source 40 is so constructed that a lenticular lens on the transmission side 41 composed of the concavo-convex pattern of a material itself composing the lightguide plate for surface light source 40 is formed on its light emitting surface 40a, and a lenticular lens on the opacity side 42 composed of the concavo-convex pattern of a material itself composing the lightguide plate for surface light source 40 is formed on its light transmission preventing surface 40b on the opposite side of the light emitting surface 40a. A plurality of recessed or projected unit lens portions 41a constituting the lenticular lens on the transmission side 41 are so formed that the directions of their ridge lines are parallel to each other, and a plurality of recessed or projected unit lens portions 42a constituting the lenticular lens on the opacity side 42 are so formed that the directions of their ridge lines are parallel to each other. Further, the directions of the ridge lines of the unit lens portions 41a of the lenticular lens on the transmission side 41 and the directions of the ridge lines of the unit lens portions 42a of the lenticular lens on the opacity side 42 are perpendicular to each other.

The lightguide plate for surface light source 40 having such a structure can be also produced by the above-mentioned producing method. Specifically, a pattern corresponding to the lenticular lens on the transmission side 41 may be formed on the plate-shaped metal mold 1b, and a pattern corresponding to the lenticular lens on the opacity side 42 may be formed on the surface of the projection 2a of the second metal mold 2. By using the above-mentioned producing method in the production of the lightguide plate for surface light source 40, the lenticular lens on the transmission side 41 and the lenticular lens on the opacity side 42 are formed simultaneously with the formation of the lightguide plate for surface light source 40, whereby the lightguide plate for surface light source 40 can be obtained in a small number of steps. When the lightguide plate for surface light source so constructed that the direction of the ridge lines of the unit lens portions 41a of the lenticular lens on the transmission side 41 and the direction of the ridge lines of the unit lens portions 42a of the lenticular lens on the opacity side 42 are parallel to each other is produced, the production can be also coped with by mounting the plate-shaped metal mold 1b again upon changing the direction thereof by approximately 90°.

Figure 5:
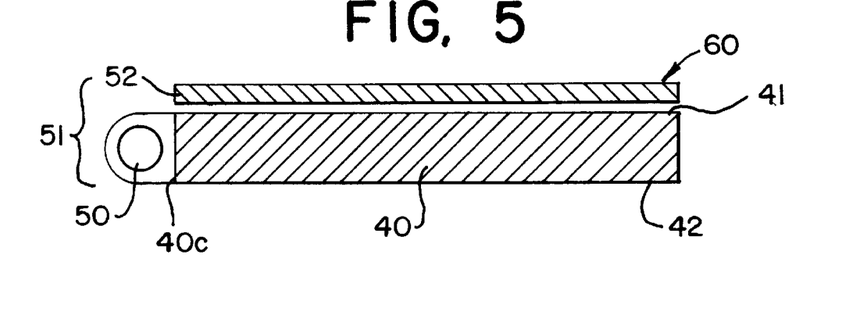
FIG. 5 is a schematic cross-sectional view showing a liquid crystal display device composed of a surface light source according to the present invention using the lightguide plate for surface light source shown in FIG. 4.

FIG. 5 is a schematic diagram showing the construction of a liquid crystal display device 60 constructed by comprising a surface light source 51 constituted by a lightguide plate for surface light source 40 and a light fixture 50 such as a fluorescent tube arranged in the vicinity of its side surface 40c, a liquid crystal panel 52 arranged on the light emission side of the surface light source 51, and various control circuits (not shown).

Light emitted from the light fixture 50 enters the lightguide plate for surface light source 40 from the side surface 40c, and is reflected from a lenticular lens on the opacity side 42 and a side surface other than the side surface 40c. The lenticular lens on the opacity side 42 has a function of focusing light, to isotropically and uniformly diffuse reflected light in a desired angular range, and introduce the diffused light in the direction of the lenticular lens on the transmission side 41.

The lenticular lens on the transmission side 41 also has a function of focusing light, and the diffused reflected light introduced in the direction of the lenticular lens on the transmission side 41 is emitted from the lenticular lens on the transmission side 41 upon being isotropically and uniformly diffused in a desired angular range.

In the above-mentioned lightguide plate for surface light source 40, the necessity of a lenticular lens sheet as shown in FIG. 11 in the conventional example is eliminated, whereby the production cost can be reduced.

(Embodiment 2)

Figure 6:
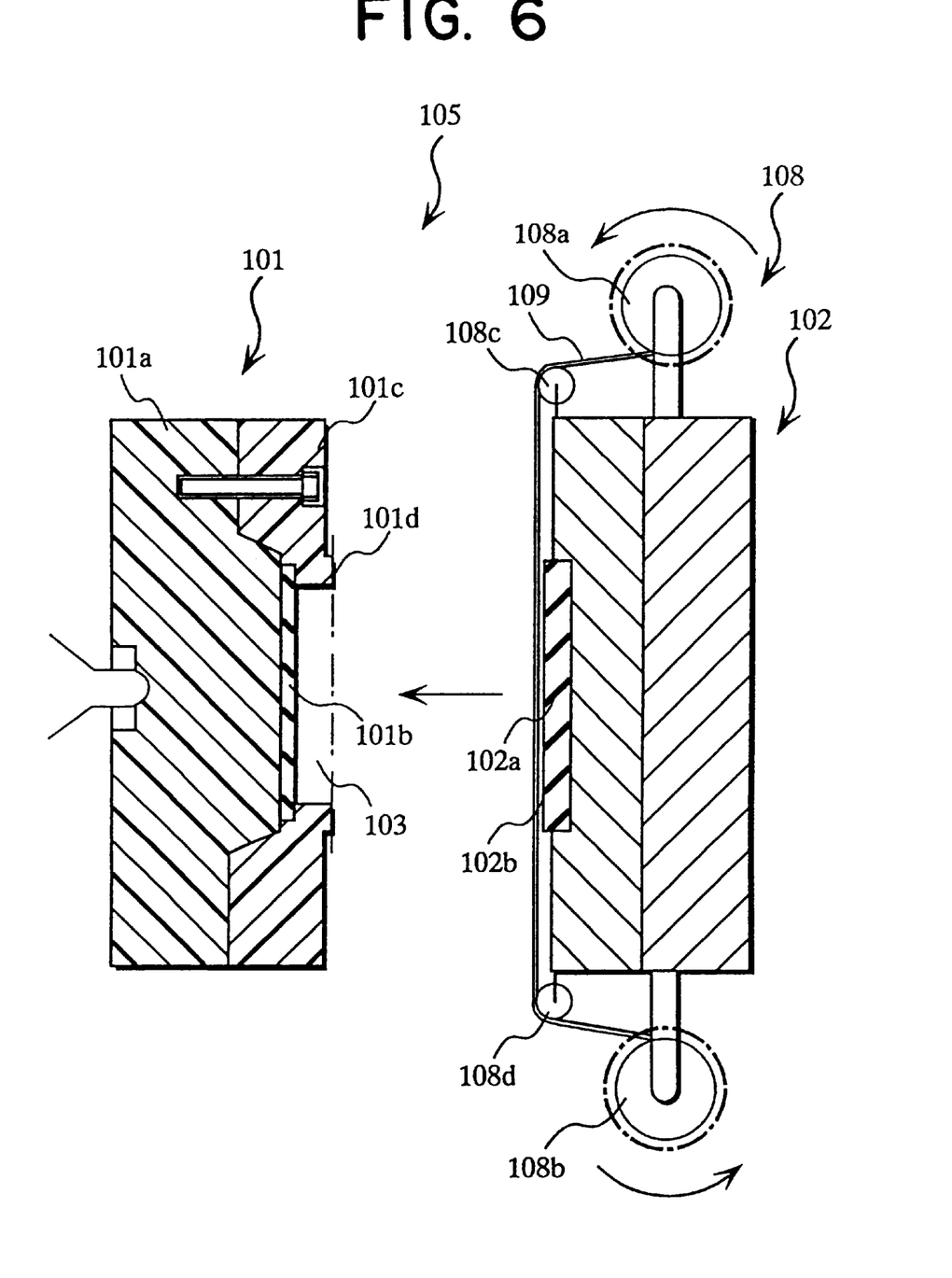
FIG. 6 is a cross-sectional view showing a state before coupling a molding die used in a method of producing a lightguide plate for surface light source according to an embodiment 2 of the present invention.
Figure 7:
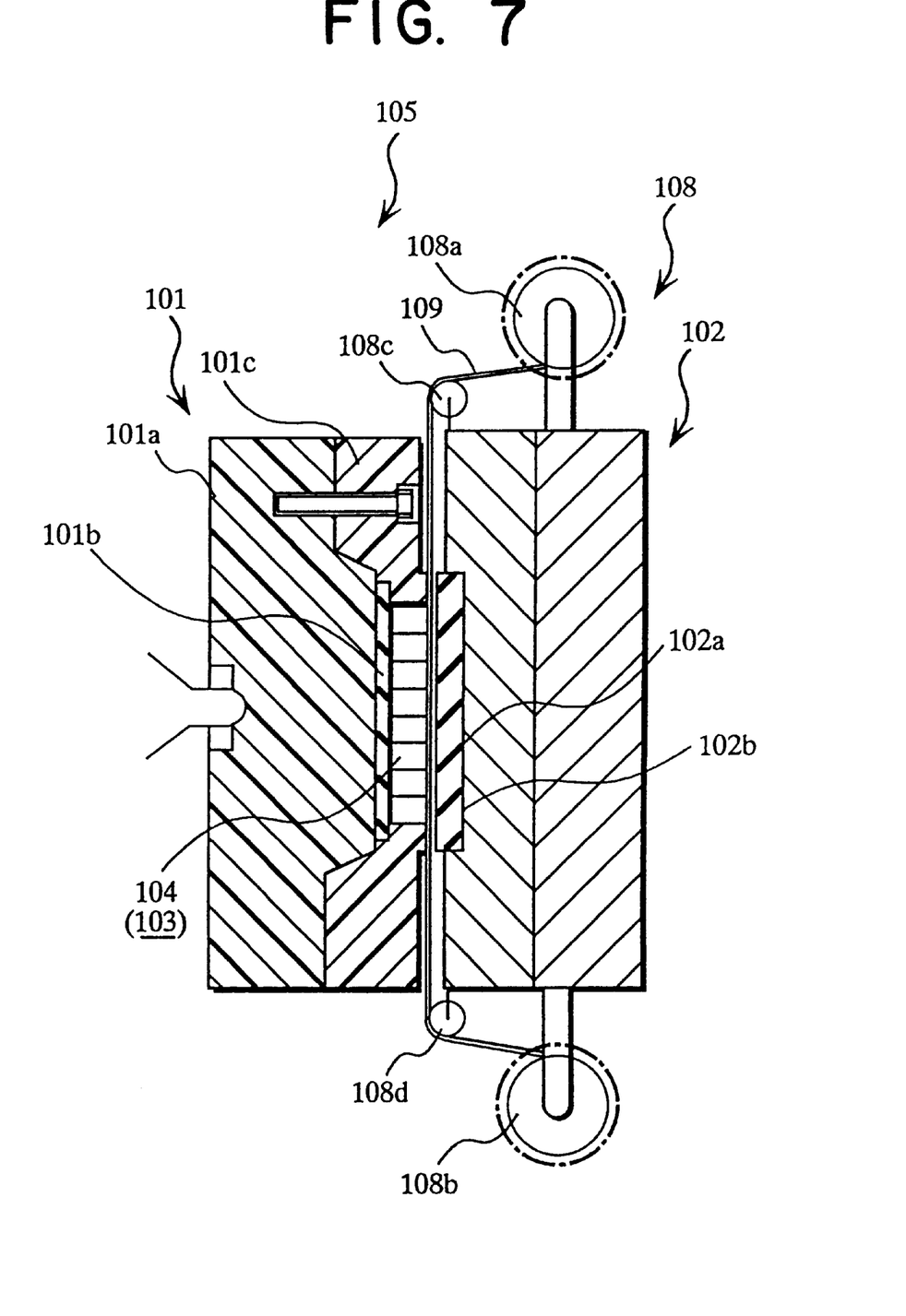
FIG. 7 is a cross-sectional view showing a state where resin is injected into a cavity after coupling a molding die used in a method of producing a lightguide plate for surface light source according to the embodiment 2 of the present invention.
Figure 8:
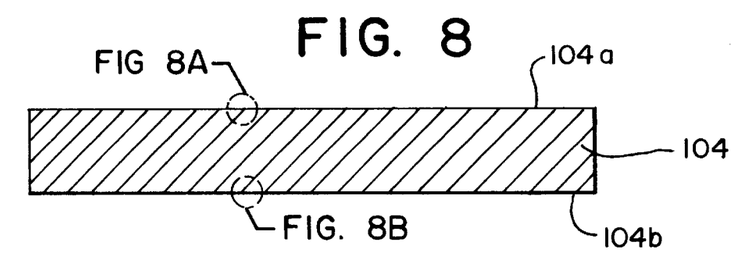
FIG. 8 is a cross-sectional view showing a lightguide plate for surface light source produced using the molding die shown in FIGS. 6 and 7.
Figure 8A:
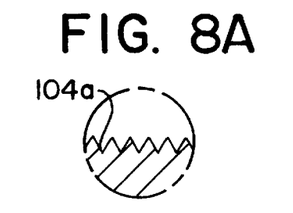
Figure 8B:
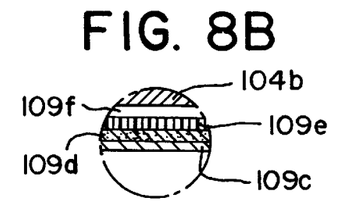

FIG. 6 is a cross-sectional view showing a state before coupling a molding die 105 used in a producing method according to the present embodiment, FIG. 7 is a cross-sectional view showing a state where resin is injected into a cavity 103 after coupling the molding die 105 shown in FIG. 6, and FIG. 8 is a cross-sectional view showing a lightguide plate for surface light source 104 produced using the molding die 105 shown in FIGS. 6 and 7.

As shown in FIG. 8, in the lightguide plate for surface light source 104, its light emitting surface 104a has such a fine pattern that it is projected in a prism shape or a quadrangular pyramid shape in order to emit light incident from its side surface toward a liquid crystal display device (not shown) uniformly throughout the surface and directionally. Each of prism-shaped portions in the fine pattern has a vertical angle (a prism angle) of 90°, a pitch of 31 $\mu$m, and a height of 31 $\mu$m, for example, and the prism-shaped portions are uniformly formed on the whole surface. Therefore, the lightguide plate for surface light source 104 has a lens function for causing emitted light to have directionality (a direction perpendicular to the light emitting surface 104a). The fine pattern may be a lenticular lens pattern.

On the other hand, a light transmission preventing surface 104b is formed by not the concavo-convex pattern of a material itself composing the lightguide plate for surface light source 104 as in the embodiment 1 but a lamination of a transparent thermal adhesive layer 109f, a transparent undercoat layer 109e, an opaque layer 109d, and a topcoat layer 109c. The topcoat layer 109c is for preventing the opaque layer 109d from corroding.

The opaque layer 109d may also have a light reflecting function. When the opaque layer 109d thus has a reflecting function, light can be completely prevented from being emitted from the light transmission preventing surface 104b. Therefore, the quantity of light leading to the light emitting surface 104a is increased, whereby the luminance on the plate surface of the lightguide plate for surface light source 104 is improved.

As shown in FIGS. 6 and 7, the molding die 105 comprises a first metal mold (on the fixed side) 101 and a second metal mold (on the movable side) 102 which can be divided.

The first metal mold 101 comprises a common use base portion 101a, a plate-shaped metal mold 101b, and a holding member 101c. The plate-shaped metal mold 101b has a pattern surface corresponding to the fine pattern of the light emitting surface 104a of the lightguide plate for surface light source 104, and is arranged with its surface on the opposite side of the pattern surface directed toward the common use base portion 101a. The plate-shaped metal mold 101b thus arranged defines the shape of a part of the cavity 103 of the molding die 105 (a portion corresponding to the light emitting surface 104a of the lightguide plate for surface light source 104). The plate-shaped metal mold 101b is so provided as to be replaceable with respect to the common use base portion 101a.

The holding member 101c is for holding an outer edge portion of the plate-shaped metal mold 101b and fixing the outer edge portion to the common use base portion 101a. The holding member 101c is for also defining the shape of a part of the cavity 103 of the molding die 105 (a side surface portion of the lightguide plate for surface light source 104), and is detachable from the common use base portion 101a by a bolt. That is, the holding member 101c is also replaceable. A fitting surface build is formed in the holding member 10c.

The second metal mold 102 is provided with a fitting member 102a, and a fitting surface 102b fit to the above-mentioned fitting surface 101d is formed at the front of the fitting member 102a. The fitting surface 102b defines a part of the cavity 103 (a portion corresponding to the light transmission preventing surface 104b of the lightguide plate for surface light source 104). However, the second metal mold 102 does not have a rough surface pattern for forming the light transmission preventing surface 104b as in the embodiment 1. The reason for this is that a light transmission preventing effect (a reflecting effect) is given in a stamping foil (a thermal transfer foil) 109 as described later. When the lightguide plate for surface light source 40 having the lenticular lens on the opacity side 42 is formed as shown in FIG. 4 in the embodiment 1, a pattern corresponding to the lenticular lens on the opacity side 42 is formed on the fitting surface 102b. In such a case, the pattern of the fitting surface 102b may be adjusted in consideration of the thickness of the stamping foil 109.

Furthermore, the second metal mold 102 is provided with a feeder 108 for arranging the stamping foil 109 at the front of the fitting surface 102b.

The feeder 108 comprises a feed roller 108a provided on one of side surfaces of the second metal mold 102, a wind-up roller 108b provided on the other side surface, and guide rollers 108c and 108d provided at edges of the respective side surfaces.

Figure 9:
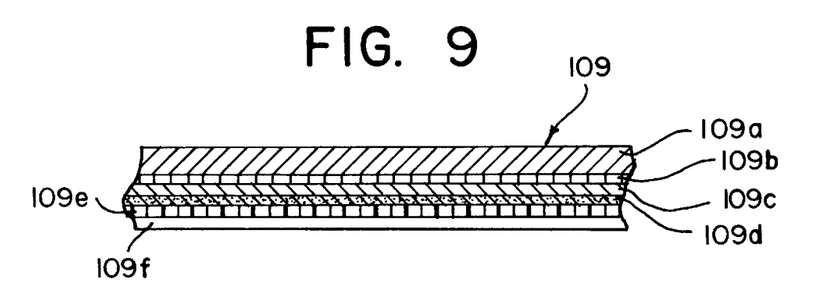
FIG. 9 is a cross-sectional view showing a stamping foil shown in FIGS. 6 and 7.

The stamping foil 109 is constructed by coating a heat-resistant film sheet 109a composed of polyester or the like having a thickness of approximately 10 $\mu$m to 100 $\mu$m with a release layer 109b, the topcoat layer 109c, the opaque layer 109d, the transparent undercoat layer 109e, and a transparent thermal adhesive layer 109f by continuous processing such as a roll coater system, as shown in FIG. 9. The opaque layer 109d may also have a function of reflecting light as described above. When the opaque layer 109d having a reflecting function is formed, a metal such as Al is so deposited on the topcoat layer 109c as to have a thickness of approximately 600 Å to 1000 Å using vacuum deposition or the like. The opaque layer 109d is not limited to a metallic reflective film composed of Al or the like. For example, it may be a thin film having a function of merely preventing the transmission of light on the rear surface and transmitting the light to the light emitting surface 104a. For example, it is possible to use a thin film which is subjected to mat finish or hairline stripe processing.

Description is now made of a method of producing the lightguide plate for surface light source 104 using the above-mentioned molding die 105. In a state where the first metal mold 101 and the second metal mold 102 are separated from each other as shown in FIG. 6, the stamping foil 109 is first so arranged that the transparent thermal adhesive layer 109f is directed toward the first metal mold 101. As shown in FIG. 7, the second metal mold 102 is moved toward the first metal mold 101 to couple the molds to each other. Thereafter, PMM (polymethyl methacrylate) resin in a molten state which is held at a temperature of approximately 200° C. is injected into the cavity 103 formed by the coupling from an inlet (not shown) at a pressure of 200 kg/cm$^2$. The temperature in the cavity 103 at this time shall be approximately 60° C. The resin to be injected is not limited to the above-mentioned PMMA resin. For example, it is possible to also use the other resin listed in the embodiment 1.

When the cavity 103 is filled with the PMMA resin, the topcoat layer 109c of the stamping foil 109 is separated from the release layer 109b by heat of the PMMA resin and molding pressure, and the transparent thermal adhesive layer 109f adheres on the light transmission preventing surface 104b of the lightguide plate for surface light source 104 composed of the PMMA resin in the cavity 103.

If the above-mentioned filling step is terminated, the step of cooling the PMMA resin for a predetermined time on the basis of a temperature program determined by the curing conditions of the PMMA resin is carried out. If the PMMA resin is solidified in the cooling step, a lightguide plate for surface light source 104 is obtained where a concavo-convex pattern corresponding to the fine pattern of the plate-shaped metal mold 1b is formed on the light emitting surface 104a, and the transparent undercoat layer 109e, the opaque layer 109d, and the topcoat layer 109c are transferred to the light transmission preventing surface 104b through the transparent thermal adhesive layer 109f. If the cooling step is terminated, the first metal mold 1 and the second metal mold 2 are separated from each other, to take out the lightguide plate for surface light source 104.

In order to form the subsequent lightguide plate for surface light source 104, the feed roller 108a and the wind-up roller 108b in the feeder 108 are synchronously rotated, to send out a new portion of the stamping foil 109, and set the new portion at the front of the fitting surface 102b.

In the method of producing a lightguide plate for surface light source according to the present embodiment, even if the lightguide plate for surface light source has a structure in which a light transmission preventing surface is not composed of the concavo-convex pattern of a material itself composing the lightguide plate for surface light source, it is possible to form the light transmission preventing surface simultaneously with the formation of the lightguide plate for surface light source using a molding die. Therefore, the number of steps can be reduced, whereby the cost of the lightguide plate for surface light source can be reduced.

Although the present invention has been described and illustrated in detail, it is clearly understood that the same is by way of illustration and example only and is not to be taken by way of limitation, the spirit and scope of the present invention being restricted only by the terms of the appended claims.

What is claimed is:

1. A method of producing a lightguide plate for a surface light source composed of a transparent material, having one surface that receives light from a source and a second surface that constitutes a light emitting surface that emits thereover the light received at said one surface, comprising the steps of:

providing a two piece molding die including first and second molds for forming a part of a cavity;

fixing a first reusable rigid metal mold member having a defining surface corresponding to the shape of the light emitting surface of the lightguide plate for a surface light source to said first mold of said two piece molding die;

fixing a replaceable holding member on said first mold to hold an outer edge of said first mold member to said first mold;

injecting resin liquid into the cavity against said first mold member defining surface;

solidifying the resin liquid;

releasing the resin from the cavity with said first mold member and said holding member remaining fixed to said first mold, so that said first mold member defining surface and said holding member produce the light-guide plate for the surface light source in a desired shape; and repeating the method using the same first mold member.

2. The method according to claim 1, wherein said defining surface of said first mold member has a concave-convex pattern for giving a lens function to the light emitting surface of the lightguide plate for the surface light source.

3. The method according to claim 2, wherein said concave-convex pattern is a lenticular lens pattern.

4. The method according to claim 1, further comprising the steps of:

providing said second mold of said molding die with a second reusable rigid metal mold member fixed thereto to define another part of the cavity, said second mold member having a defining surface corresponding to the outer shape of another surface of the lightguide plate for the surface light source;

injecting the resin into the mold cavity against the defining surfaces of both said first and second mold members; and removing the solidified liquid resin from the cavity with said first and second mold members remaining fixed to the respective first and second molds, said second mold member defining surface having produced the outer shape of the another surface of the lightguide plate; and repeating the method also using the same second mold member.

5. The method according to claim 1, wherein one of said first and second molds of said molding die has a third reusable rigid metal mold member to define a part of the cavity, and a surface opposite to the light emitting surface of said lightguide plate for the surface light source is shaped by a pattern formed on said third mold member.

6. The method according to claim 4, wherein the step of forming the surface opposite to the light emitting surface of the lightguide plate for the surface light source comprises:

providing a thermal transfer foil constructed by coating a light transmission preventing material on a base film in the form of a thin film layer arranged so that the light transmission preventing material is directed toward the cavity between one of said first and second molds of the molding die and the other of said first and second molds, and on the surface opposite to the light emitting surface of the lightguide plate for the surface light source, coupling said first and second molds together to form the cavity, injecting the resin into the cavity, and transferring the light transmission preventing material to the surface opposite to the light emitting surface of the lightguide plate for the surface light source by melting heat and molding pressure at the time of the injection of the resin.

7. The method according to claim 6, wherein said light transmission preventing material contains a light reflecting material.

8. The method according to claim 7 further comprising the step of forming a corrosion inhibiting layer on said thermal transfer foil for preventing the light transmission preventing material containing the reflecting material from corroding, the corrosion inhibiting layer being also transferred to the surface opposite to the light emitting surface of the lightguide plate for the surface light source by melting heat at the time of the injection of the resin and molding pressure.

9. The method according to claim 6, further comprising separating said first and-second molds, and drawing a new portion of the-thermal transfer foil into the cavity after said first and second molds are separated.

10. The method according to claim 9, wherein said drawing step comprises drawing said transfer foil out of a feed roller and winding said transfer foil on a wind-up roller, both said rollers being mounted on the molding die.

11. The method according to claim 1 wherein said first mold member is replaceable.

12. The method according to claim 4 wherein said second mold member is replaceable.

13. The method according to claim 5, wherein said third mold member is replaceable.

14. The method according to claim 1 wherein said replaceable holding member has an opening to provide access to said first mold member defining surface into which the resin is injected, the size of the opening determining the size of the lightguide plate.

15. The method of claim 14 wherein said second mold has a part which extends into said opening of said replaceable holding member.

* * * * *